US008089913B2

(12) United States Patent
Proctor, Jr. et al.

(10) Patent No.: US 8,089,913 B2
(45) Date of Patent: *Jan. 3, 2012

(54) PHYSICAL LAYER REPEATER WITH SELECTIVE USE OF HIGHER LAYER FUNCTIONS BASED ON NETWORK OPERATING CONDITIONS

(75) Inventors: James A. Proctor, Jr., Melbourne Beach, FL (US); Kenneth M. Gainey, Satellite Beach, FL (US); Carlos M. Puig, Santa Clara, CA (US); James C. Otto, West Melbourne, FL (US); Lawrence W. LaMont, Jr., Indialantic, FL (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 11/790,933

(22) Filed: Apr. 30, 2007

(65) Prior Publication Data

US 2007/0286110 A1 Dec. 13, 2007

Related U.S. Application Data

(63) Continuation of application No. 11/339,838, filed on Jan. 26, 2006, now Pat. No. 7,230,935, which is a continuation-in-part of application No. 10/531,077, filed as application No. PCT/US03/31515 on Oct. 24, 2003.

(60) Provisional application No. 60/420,449, filed on Oct. 24, 2002.

(51) Int. Cl.
 *H04B 7/14* (2006.01)
(52) U.S. Cl. ......................................... 370/315

(58) Field of Classification Search .................. 370/419, 370/315, 389, 535, 311, 487, 392, 387, 343, 370/395, 352, 232, 235, 351, 331, 401, 400, 370/353, 236, 229, 239, 390; 455/11.1, 42, 455/102, 445, 561, 315, 456, 522; 725/127, 725/73, 72, 74; 375/214, 141, 142, 150, 375/146, 147, 260
See application file for complete search history.

(56) References Cited

U.S. PATENT DOCUMENTS 3,363,250 A 1/1968 Irving
(Continued)

FOREIGN PATENT DOCUMENTS

CN 1186401 7/1998
(Continued)

OTHER PUBLICATIONS

International Search Report for the corresponding International Application No. PCT/SU06/02508 dated Mar. 5, 2007.

(Continued)

*Primary Examiner* — Hassan Phillips
*Assistant Examiner* — Prenell P Jones
(74) *Attorney, Agent, or Firm* — Linda G. Gunderson

(57) ABSTRACT

A physical layer frequency translating repeater for use in a wireless network can include a baseband section with demodulator, a processor and a memory. A portion of a packet for repeating can be processed during a physical layer repeating operation and a higher layer function performed without modification of an address. A received signal can be processed on a symbol-by-symbol basis in a first symbol interval, and regenerated after at least a second symbol interval and prior to completion of the demodulating the received signal. A hybrid network device can include a network node portion and a physical layer repeater portion.

30 Claims, 5 Drawing Sheets

U.S. PATENT DOCUMENTS

| | | | |
|---|---|---|---|
| 4,000,467 A | 12/1976 | Lentz et al. | |
| 4,001,691 A | 1/1977 | Gruenberg | |
| 4,061,970 A | 12/1977 | Magneron et al. | |
| 4,081,752 A | 3/1978 | Sumi | |
| 4,124,825 A | 11/1978 | Webb et al. | |
| 4,204,016 A | 5/1980 | Chavannes | |
| 4,334,323 A | 6/1982 | Moore | |
| 4,368,541 A | 1/1983 | Evans | |
| 4,509,206 A | 4/1985 | Carpe et al. | |
| 4,701,935 A | 10/1987 | Namiki | 375/214 |
| 4,723,302 A | 2/1988 | Fulmer et al. | |
| 4,777,653 A | 10/1988 | Bonnerot et al. | |
| 4,783,843 A | 11/1988 | Leff et al. | |
| 4,820,568 A | 4/1989 | Harpell et al. | |
| 4,922,259 A | 5/1990 | Hall et al. | |
| 5,023,930 A | 6/1991 | Leslie | |
| 5,095,528 A | 3/1992 | Leslie et al. | |
| 5,214,788 A | 5/1993 | Delaperriere et al. | |
| 5,220,562 A | 6/1993 | Takada et al. | |
| 5,280,480 A | 1/1994 | Pitt et al. | |
| 5,333,175 A | 7/1994 | Ariyavisitakul et al. | |
| 5,341,364 A | 8/1994 | Marra et al. | |
| 5,349,463 A | 9/1994 | Hirohashi et al. | |
| 5,368,897 A | 11/1994 | Kurihara | |
| 5,371,734 A | 12/1994 | Fischer | 370/311 |
| 5,373,503 A | 12/1994 | Chen et al. | |
| 5,383,144 A | 1/1995 | Kato | |
| 5,408,197 A | 4/1995 | Miyake et al. | |
| 5,408,618 A | 4/1995 | Aho et al. | |
| 5,430,726 A | 7/1995 | Moorwood et al. | |
| 5,446,770 A | 8/1995 | Urabe et al. | |
| 5,465,251 A | 11/1995 | Judd et al. | |
| 5,471,642 A | 11/1995 | Palmer | |
| 5,485,486 A | 1/1996 | Gilhousen et al. | |
| 5,509,028 A | 4/1996 | Marque-Pucheu et al. | |
| 5,515,376 A | 5/1996 | Murthy et al. | |
| 5,519,519 A | 5/1996 | Seda | |
| 5,608,755 A | 3/1997 | Rakib et al. | |
| 5,610,916 A * | 3/1997 | Kostreski et al. | 370/487 |
| 5,648,984 A | 7/1997 | Kroninger et al. | |
| 5,654,979 A | 8/1997 | Levin et al. | 375/142 |
| 5,659,879 A | 8/1997 | Dupuy | |
| 5,678,177 A | 10/1997 | Beasley | |
| 5,678,198 A | 10/1997 | Lemson et al. | |
| 5,684,801 A | 11/1997 | Amitay et al. | |
| 5,697,052 A | 12/1997 | Treatch | |
| 5,726,980 A | 3/1998 | Rickard et al. | |
| 5,732,334 A | 3/1998 | Miyake et al. | |
| 5,745,846 A | 4/1998 | Myer et al. | |
| 5,754,540 A | 5/1998 | Liu et al. | 370/315 |
| 5,764,636 A | 6/1998 | Edsall et al. | |
| 5,767,788 A | 6/1998 | Ness | |
| 5,771,174 A | 6/1998 | Spinner et al. | |
| 5,784,683 A * | 7/1998 | Sistanizadeh et al. | 725/73 |
| 5,794,145 A | 8/1998 | Milam | |
| 5,812,933 A | 9/1998 | Niki | |
| 5,815,795 A | 9/1998 | Iwai | |
| 5,825,809 A | 10/1998 | Sim | |
| 5,852,629 A | 12/1998 | Iwamatsu et al. | |
| 5,857,144 A | 1/1999 | Mangum et al. | |
| 5,862,207 A | 1/1999 | Aoshima | |
| 5,875,179 A | 2/1999 | Tikalsky | |
| 5,883,884 A | 3/1999 | Atkinson | |
| 5,884,181 A | 3/1999 | Arnold et al. | |
| 5,890,055 A | 3/1999 | Chu et al. | |
| 5,903,553 A | 5/1999 | Sakamoto et al. | |
| 5,907,794 A | 5/1999 | Lehmusto et al. | |
| 5,963,846 A | 10/1999 | Kurby et al. | |
| 5,963,847 A | 10/1999 | Ito et al. | |
| 5,987,304 A | 11/1999 | Latt | |
| 6,005,855 A | 12/1999 | Zehavi et al. | |
| 6,005,884 A | 12/1999 | Cook et al. | |
| 6,014,380 A * | 1/2000 | Hendel et al. | 370/392 |
| 6,032,194 A | 2/2000 | Gai et al. | |
| 6,061,548 A | 5/2000 | Reudink et al. | |
| 6,088,570 A | 7/2000 | Komara et al. | |
| 6,101,400 A * | 8/2000 | Ogaz et al. | 455/561 |
| 6,108,364 A | 8/2000 | Weaver, Jr. et al. | |
| 6,128,512 A | 10/2000 | Trompower et al. | |
| 6,128,729 A | 10/2000 | Kimball et al. | |
| 6,163,276 A | 12/2000 | Irving et al. | |
| 6,188,694 B1 | 2/2001 | Fine et al. | |
| 6,188,719 B1 | 2/2001 | Collomby | |
| 6,195,051 B1 | 2/2001 | McCoy et al. | |
| 6,202,114 B1 | 3/2001 | Dutt et al. | |
| 6,215,982 B1 | 4/2001 | Trompower et al. | |
| 6,219,739 B1 | 4/2001 | Dutt et al. | |
| 6,222,503 B1 | 4/2001 | Gietema et al. | |
| 6,272,351 B1 | 8/2001 | Langston et al. | |
| 6,285,863 B1 | 9/2001 | Zhang et al. | |
| 6,298,061 B1 | 10/2001 | Chin et al. | |
| 6,304,563 B1 | 10/2001 | Blessent et al. | |
| 6,304,575 B1 | 10/2001 | Carroll et al. | |
| 6,331,792 B1 | 12/2001 | Tonietto et al. | |
| 6,339,694 B1 | 1/2002 | Komara et al. | |
| 6,342,777 B1 | 1/2002 | Takahashi et al. | |
| 6,363,068 B1 | 3/2002 | Kinoshita et al. | |
| 6,370,185 B1 | 4/2002 | Schmutz et al. | 375/214 |
| 6,370,369 B1 | 4/2002 | Kraiem et al. | |
| 6,377,612 B1 | 4/2002 | Baker et al. | |
| 6,377,640 B2 | 4/2002 | Trans et al. | |
| 6,384,765 B1 | 5/2002 | Sjostrand et al. | |
| 6,385,181 B1 | 5/2002 | Tsutsui et al. | |
| 6,388,995 B1 | 5/2002 | Gai et al. | |
| 6,393,299 B1 | 5/2002 | Mizumoto et al. | |
| 6,404,775 B1 | 6/2002 | Leslie et al. | |
| 6,441,781 B1 | 8/2002 | Rog et al. | |
| 6,473,131 B1 | 10/2002 | Neugebauer et al. | |
| 6,480,481 B1 | 11/2002 | Park et al. | |
| 6,501,955 B1 | 12/2002 | Durrant et al. | |
| 6,535,732 B1 * | 3/2003 | McIntosh et al. | 455/445 |
| 6,539,028 B1 | 3/2003 | Soh et al. | |
| 6,539,204 B1 | 3/2003 | Marsh et al. | |
| 6,549,542 B1 | 4/2003 | Dong et al. | |
| 6,549,567 B1 | 4/2003 | Fullerton et al. | |
| 6,563,468 B2 | 5/2003 | Hill et al. | |
| 6,574,198 B1 | 6/2003 | Petersson | |
| 6,628,624 B1 | 9/2003 | Mahajan et al. | |
| 6,664,932 B2 | 12/2003 | Sabet et al. | |
| 6,671,502 B1 | 12/2003 | Ogawa et al. | |
| 6,684,058 B1 | 1/2004 | Karacaoglu et al. | |
| 6,690,657 B1 * | 2/2004 | Lau et al. | 370/315 |
| 6,694,125 B2 | 2/2004 | White et al. | |
| 6,718,160 B2 | 4/2004 | Schmutz et al. | |
| 6,728,541 B2 | 4/2004 | Ohkura et al. | |
| 6,766,113 B1 | 7/2004 | Al-Salameh et al. | |
| 6,781,544 B2 | 8/2004 | Saliga et al. | |
| 6,788,256 B2 | 9/2004 | Hollister | |
| 6,880,103 B2 | 4/2005 | Kim et al. | |
| 6,888,881 B1 | 5/2005 | Nagano | |
| 6,904,266 B1 | 6/2005 | Jin et al. | |
| 6,906,669 B2 | 6/2005 | Sabet et al. | |
| 6,934,511 B1 | 8/2005 | Lovinggood et al. | 455/11.1 |
| 6,934,555 B2 | 8/2005 | Silva et al. | |
| 6,944,139 B1 | 9/2005 | Campanella | 370/315 |
| 6,957,042 B2 | 10/2005 | Williams et al. | |
| 6,983,162 B2 | 1/2006 | Garani et al. | |
| 6,985,516 B1 | 1/2006 | Easton et al. | 375/150 |
| 6,990,313 B1 | 1/2006 | Yarkosky et al. | |
| 7,027,418 B2 | 4/2006 | Gan et al. | |
| 7,027,770 B2 | 4/2006 | Judd et al. | |
| 7,043,203 B2 | 5/2006 | Miquel et al. | |
| 7,050,442 B1 | 5/2006 | Proctor | |
| 7,050,452 B2 | 5/2006 | Sugar et al. | |
| 7,058,071 B1 | 6/2006 | Myles et al. | |
| 7,058,368 B2 | 6/2006 | Nicholls et al. | |
| 7,088,734 B2 | 8/2006 | Newberg et al. | |
| 7,103,344 B2 | 9/2006 | Menard et al. | |
| 7,120,930 B2 | 10/2006 | Maufer et al. | |
| 7,123,670 B2 | 10/2006 | Gilbert et al. | |
| 7,123,676 B2 | 10/2006 | Gebara et al. | |
| 7,132,988 B2 | 11/2006 | Yegin et al. | |
| 7,133,391 B2 | 11/2006 | Belcea | |
| 7,133,460 B2 | 11/2006 | Bae et al. | |
| 7,139,527 B2 | 11/2006 | Tamaki et al. | |
| 7,167,526 B2 | 1/2007 | Liang et al. | |
| 7,187,904 B2 | 3/2007 | Gainey et al. | |

| | | |
|---|---|---|
| 7,193,975 B2 | 3/2007 | Tsutsumi et al. |
| 7,194,275 B2 | 3/2007 | Bolin et al. |
| 7,200,134 B2 | 4/2007 | Proctor, Jr. et al. |
| 7,215,964 B2 | 5/2007 | Miyake |
| 7,230,935 B2 * | 6/2007 | Proctor et al. ............... 370/315 |
| 7,233,771 B2 | 6/2007 | Proctor, Jr. et al. |
| 7,248,645 B2 | 7/2007 | Vialle |
| 7,254,132 B2 | 8/2007 | Takao et al. |
| 7,299,005 B1 | 11/2007 | Yarkosky et al. |
| 7,315,573 B2 | 1/2008 | Lusky et al. |
| 7,319,714 B2 | 1/2008 | Sakata et al. |
| 7,321,787 B2 | 1/2008 | Kim |
| 7,339,926 B2 | 3/2008 | Stanwood et al. |
| 7,352,696 B2 | 4/2008 | Stephens et al. |
| 7,406,060 B2 | 7/2008 | Periyalwar et al. |
| 7,409,186 B2 | 8/2008 | Van Buren et al. |
| 7,430,397 B2 | 9/2008 | Suda et al. |
| 7,450,936 B2 | 11/2008 | Kim |
| 7,457,587 B2 | 11/2008 | Chung |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal |
| 7,676,194 B2 | 3/2010 | Rappaport |
| 7,729,669 B2 | 6/2010 | Van Buren et al. |
| 2001/0031646 A1 | 10/2001 | Williams |
| 2001/0040699 A1 | 11/2001 | Osawa et al. |
| 2001/0050580 A1 | 12/2001 | O'Toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt |
| 2002/0061031 A1 | 5/2002 | Sugar et al. |
| 2002/0089945 A1 | 7/2002 | Belcea |
| 2002/0101843 A1 | 8/2002 | Sheng et al. |
| 2002/0102948 A1 | 8/2002 | Stanwood et al. |
| 2002/0109585 A1 | 8/2002 | Sanderson |
| 2002/0115409 A1 | 8/2002 | Khayrallah et al. |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0026363 A1 | 2/2003 | Stoter et al. |
| 2003/0063583 A1 | 4/2003 | Padovani et al. |
| 2003/0139175 A1 | 7/2003 | Kim et al. |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin |
| 2003/0236069 A1 | 12/2003 | Sakata et al. |
| 2004/0029537 A1 | 2/2004 | Pugel et al. |
| 2004/0038707 A1 | 2/2004 | Kim et al. |
| 2004/0047333 A1 | 3/2004 | Proctor, Jr., et al. |
| 2004/0047335 A1 | 3/2004 | Proctor, Jr. et al. |
| 2004/0056802 A1 | 3/2004 | Hollister |
| 2004/0110469 A1 | 6/2004 | Judd et al. |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0248581 A1 | 12/2004 | Seki et al. |
| 2004/0264511 A1 | 12/2004 | Futch et al. ................... 370/535 |
| 2005/0014464 A1 | 1/2005 | Larsson et al. |
| 2005/0030891 A1 | 2/2005 | Stephens et al. |
| 2005/0042999 A1 | 2/2005 | Rappaport |
| 2005/0130587 A1 | 6/2005 | Suda et al. |
| 2005/0190822 A1 | 9/2005 | Fujii et al. |
| 2005/0201315 A1 | 9/2005 | Lakkis et al. |
| 2005/0254442 A1 | 11/2005 | Proctor et al. |
| 2005/0256963 A1 | 11/2005 | Proctor Jr. et al. |
| 2005/0286448 A1 | 12/2005 | Proctor et al. |
| 2006/0019603 A1 | 1/2006 | Pergal |
| 2006/0028388 A1 | 2/2006 | Schantz |
| 2006/0035643 A1 | 2/2006 | Vook et al. |
| 2006/0041680 A1 | 2/2006 | Proctor |
| 2006/0052066 A1 | 3/2006 | Cleveland et al. |
| 2006/0052099 A1 | 3/2006 | Parker et al. |
| 2006/0056352 A1 | 3/2006 | Proctor et al. |
| 2006/0063484 A1 | 3/2006 | Proctor |
| 2006/0063485 A1 | 3/2006 | Gainey et al. |
| 2006/0098592 A1 | 5/2006 | Proctor Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic et al. |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0286110 A1 | 12/2007 | Proctor et al. |
| 2008/0057862 A1 | 3/2008 | Smith et al. |
| 2008/0233942 A9 | 9/2008 | Kim et al. |

FOREIGN PATENT DOCUMENTS

| | | |
|---|---|---|
| EP | 0523687 | 1/1993 |
| EP | 0709973 A1 | 5/1996 |
| EP | 0715423 | 6/1996 |
| EP | 0847146 A2 | 6/1998 |
| EP | 0853393 A1 | 7/1998 |
| EP | 0860953 | 8/1998 |
| GB | 2272599 | 5/1994 |
| GB | 2351420 A | 12/2000 |
| JP | 62040895 | 2/1987 |
| JP | 63160442 | 7/1988 |
| JP | 64011428 | 1/1989 |
| JP | 2100358 A | 4/1990 |
| JP | 3021884 A | 1/1991 |
| JP | 05063623 | 3/1993 |
| JP | 05102907 | 4/1993 |
| JP | 6013947 A | 1/1994 |
| JP | 06334577 | 12/1994 |
| JP | 07030473 | 1/1995 |
| JP | 07-079187 | 3/1995 |
| JP | 07079205 | 3/1995 |
| JP | 07131401 | 5/1995 |
| JP | 08-097762 | 4/1996 |
| JP | 8274706 A | 10/1996 |
| JP | 09130322 | 5/1997 |
| JP | 09-162903 | 6/1997 |
| JP | 09162801 | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 11055713 | 2/1999 |
| JP | 11127104 | 5/1999 |
| JP | 11298421 | 10/1999 |
| JP | 2000031877 | 1/2000 |
| JP | 2000502218 | 2/2000 |
| JP | 2000082983 A | 3/2000 |
| JP | 20000236290 A | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2002033691 | 1/2002 |
| JP | 2002111571 A | 4/2002 |
| JP | 2002271255 A | 9/2002 |
| JP | 2003174394 A | 6/2003 |
| JP | 2003198442 | 7/2003 |
| JP | 2003244050 | 8/2003 |
| JP | 2004056210 | 2/2004 |
| JP | 2004328666 | 11/2004 |
| JP | 2005072646 | 3/2005 |
| JP | 2005110150 | 4/2005 |
| JP | 2005236626 | 9/2005 |
| JP | 2005531265 | 10/2005 |
| JP | 2006503484 | 1/2006 |

| | | |
|---|---|---|
| JP | 2006505146 | 2/2006 |
| JP | 09018484 A | 1/2009 |
| KR | 20040004261 A | 1/2004 |
| KR | 100610929 | 8/2006 |
| WO | WO9214339 | 8/1992 |
| WO | WO 9715991 | 5/1997 |
| WO | WO9734434 | 9/1997 |
| WO | WO9858461 A1 | 12/1998 |
| WO | WO9959264 A2 | 11/1999 |
| WO | WO0050971 A2 | 8/2000 |
| WO | WO0152447 | 7/2001 |
| WO | WO0108251 A1 | 11/2001 |
| WO | WO 0199308 | 12/2001 |
| WO | 0208857 | 1/2002 |
| WO | 0217572 | 2/2002 |
| WO | WO03013005 A2 | 2/2003 |
| WO | 2004002014 | 12/2003 |
| WO | WO 2004001892 | 12/2003 |
| WO | WO2004001986 A2 | 12/2003 |
| WO | WO2004004365 A2 | 1/2004 |
| WO | WO2004032362 | 4/2004 |
| WO | WO 2004036789 | 4/2004 |
| WO | WO2004038958 | 5/2004 |
| WO | 2004062305 A1 | 7/2004 |
| WO | WO2005115022 | 12/2005 |

OTHER PUBLICATIONS

O. Andrisano and N. Ladisa, On the Spectral Efficiency of CPM Systems over Real Channel in the Presence of Adjacent Channel and Cochannel Interference: A Comparison Between Partial and Full Response Systems, IEEE Transactions on Vehicular Technology, vol. 39, No. 2, May 1990.
U.S. PTO Office Action mailed on Nov. 6, 2006 for the corresponding parent patent U.S. Appl. No. 11/339,838, now U.S. Patent No. 7,230,935.
U.S. PTO Office Action mailed on Nov. 21, 2006 for the corresponding parent patent U.S. Appl. No. 11/339,838, now U.S. Patent No. 7,230,935.
U.S. PTO Office Action mailed on Jan. 24, 2007 for the corresponding parent patent U.S. Appl. No. 11/339,838, now U.S. Patent No. 7,230,935.
U.S. PTO Notice of Allowance mailed on Apr. 17, 2007 for the corresponding parent patent U.S. Appl. No. 11/339,838, now U.S. Patent No. 7,230,935.
International Preliminary Report on Patentability-PCT/US06/002508, The International Bureau of WIPO, Geneva Switzerland-Jul. 29, 2008.
Written Opinion-PCT/US06/002508, International Search Authority-US-Alexandria Virginia-Mar. 5, 2007.
Mexican Office communication dated Jul. 2, 2007 issued from Mexican Patent Office for application PA/a/2004/011588 with partial translation thereof.
Translation of Office Action issued by Chine Patent Office on Oct. 19, 2007 in connection with the Corresponding Chinese application No. 03814391.7.
Office Action issued from Mexican Patent Application the Mexican Patent Office dated Feb. 22, 2008 in connection with the corresponding Chinese application No. 03814391.7.
Office communication dated Oct. 19, 2006 issued from the Mexican Patent Office for counterpart application No. PA/a/2004011588.
Code of Federal Regulations, Title 47 Telecommunication; "Federal Commission Commission code part 15.407," Federal Communications Commission vol. 1, chapter I, part 15.407.
Notification of the First Office Action from Chinese Patent Offiice dates Sep. 8, 2006 for the corresponding Chinese patent application No. 200380105267.7.
IEEE Std 802.11-1999 (Reaff 2003), "Part 11: Wireless LAN Medium Access Controi (MAC) and Physical Layer (PHY) Specifications," LAN MAN Standards Committee of the IEEE Computer Society; Paragraphs 7.2.3.1 and 7,2.3.9; Paragraph 7.3.2.4; Paragraphs 15.4.6.2 and 18.4.6.2.
IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.
IEEE Std 802.11g2003, "Part 11: Wireless LAN Medium Access Control (MAC) and Physical Layer (PHY) specifications: Amendment 4: Further Higher Data Rate Extension in the 2.4 GHz sand," IEEE Computer Society, Published by The institute of Electrical and Electronics Engineers, Inc., Jun. 27, 2003.
IEEE Std 802.16-2001; "Part 16: Air Interface for Fixed Broadband Wireless Access Systems," IEEE Computer Society and the IEEE Microwave Theory and Techniques Society, Published by The Institute of Electrical and Electronics Engineers. Inc., Apr. 8. 2002.
First Report issued by IP Australia on Jul. 31, 2007 in connection with the corresponding Australian application No. 2003239577.
Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.
First Office Action issued from the Chinese Patent Office in connection with corresponding Chinese application No. 200380101286.2. (corresponding U.S. Appl. No. 10/530,546).
Draft Corrigendum to IEEE Standard for Local and Metropolitan Area Networks—Part 16: Air Interface for Fixed Broadband Wireless Access Systems, IEEE P802.16-2004/Cor1/D5.
Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands.
IEEE 802.16(e), Part 16: Air Interface for Fixed Broadband Wireless Access Systems, 2005, Sections 8.4.10.2.1; 8.4.10.3.2.
IEEE Std. 802.11-999 (Reaff 2003), Part 11: Wireless LAN Medium Access Control (MAC) and Physical Layer (PHY) Specifications.
IEEE Std. 802.16e-2005, Part 16: Air Interface for Interface for Fixed and Mobile Broadband Wireless Access Systems.
Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.
Kutlu, et al., "Performance Analysis of MAC Protocols for Wireless Control Area Network," 1996 IEEE, pp. 494-499.
Office communication dated Jan. 12, 2007 issued from the European Patent Office for counterpart application No. 03734136.9-1246. (corresponding U.S. Appl. No. 10/516,327).
Official communication issued from the European Patent Office dated Aug. 7, 2007 for the corresponding European patent application No. 03759271.4-2412. (corresponding U.S. Appl. No. 10/531,078).
Official communication issued from the European Patent Office dated Dec. 19, 2006 for the corresponding European patent application No. 03759271.4-2412. (corresponding U.S. Appl. No. 10/531,078).
Second Office Action issued from the Chinese Patent Office on Jul. 20, 2007 in connection with corresponding Chinese application No. 200380101286.2. (corresponding U.S. Appl. No. 10/530,546).
Specifications for 2.3 GHz Band Portable Internet Service—Physical & Medium Access Control Layer, TTAS.KO-06.0082/R1, Dec. 2005.
Third Office Action issued from the Patent Office of People's Republic of China dated Jan. 4, 2008 in corresponding Chinese Patent Application No. 200380101286.2. (corresponding U.S. Appl. No. 10/530,546).
U.S. PTO Office Action mailed on Nov. 6, 2006 for the corresponding parent patent U.S. Appl. No. 11/339,838, now U.S. Patent No. 7,230,935, Apr. 17, 2007.
Draft IEEE Standard for Local and Metropolitan Area Networks-Part 16: Air Interface for Fixed and Mobile Broadband Wireless Access Systems; Amendment for Physical and Medium Access Control Layers for Combined Fixed and Mobile Operation in Licensed Bands. IEEE P802.16E/D12, Oct. 2005.
European Search Opinion—EP08004269, Search Authority—The Hague, Apr. 15, 2008.

European Search Report—EP03781739, Search Authority—Munich Patent Office, May 7, 2010.
European Search Report—EP05750008, Search Authority—Munich Patent Office, Jun. 10, 2010.
European Search Report—EP05758871, Search Authority—Munich Patent Office, Jun. 11, 2010.
International Search Report—PCT/US03/029117, ISA/US—Feb 13, 2004.
International Search Report—PCT/US03/029130, ISA/US—Jan. 21, 2004.
International Search Report—PCT/US03/031515—ISA/US—Apr. 4, 2004.
International Search Report—PCT/US04/007708, ISA/US—Oct. 18, 2004.
International Search Report—PCT/US05/016592, ISA/US—Jun. 28, 2006.
International Search Report—PCT/US06/002899; ISA/US—Apr. 6, 2007.
International Search Report—PCT/US07/007978, ISA/US—Sep. 24, 2008.
International Search Report and Written Opinion—PCT/US07/019163, ISA/US—Sep. 10, 2008.
International Search Report and Written Opinion—PCT/US07/022743, ISA/EPO—Mar. 17, 2008.
International Search Report and Written Opinion—PCT/US2006/022075—ISA/EPO—Oct. 24, 2007.
International Search Report—PCT/US03/039889—ISA/US—May 1904.
International Search Report PCT/US06/002900 ISA/US May 13, 2008.
International Search Report PCT/US06/45123, ISA/EPO Nov. 2, 2007.
International Search Report—PCT/US2003/035050, ISA/US—May 21, 2004.
International Search Report—PCT/US2005/019585, ISA/US May 22, 2006
Office Action English translation dated Jul. 4, 2008 issued from Chinese Patent Office for Application No. 03814391.7.
Office Action English translation dated Jun. 29, 2009 issued from Japanese Patent Office for Application No. 2004-541532.
Supplementary European Search Report—EP03759235, Search Authority—The Hague, Sep. 19, 2006.
Supplementary European Search Report—EP03759271, Search Authority—Munich Patent Office, Sep. 14, 2006.
Supplementary European Search Report—EP08004269, Search Authority—The Hague, Apr. 15, 2008.
Translation of Office Action in Japanese application 2004-544751, corresponding to US T application 10/531,078, citing W000050971, JP2002-111571, JP05-102907, JP6.3-160442, JP2000-502218, JP10-032557 and JP2000-082983. Dated Oct. 16, 2009.
Translation of Office Action in Japanese application 2004-553510, corresponding to U.S. Appl. No. 10/533,589, citing W000050971 and JP09-182155. Dated Nov. 26, 2009.
Translation of Office Action in Japanese application 2004-565505, corresponding to U.S. Appl. No. 10/563,471, citing JP08-097762 and JP2001-111575 Dated Sep. 9, 2009.
Translation of Office Action in Japanese application 2004-565505, corresponding to U.S. Appl. No. 10/563,471, citing JP09-018484. Dated Mar. 26, 2010.
Written Opinion—PCT/US04/007708, ISA/ US Oct. 18, 2004.
Written Opinion— PCT/US05/016592, ISA/ US—Jun. 28, 2006.
Written Opinion—PCT/US07/007978, International Search Authority—US—Sep. 24, 2008.
Written Opinion—PCT/US2006/045123, ISA/ EPO—Nov. 2, 2007.
Written Opinion—PCT/US06/002900, ISA/ US—May 13, 2008.
Written Opinion—PCT/US2005/019585, ISA/ US—May 22, 2006.
Translation of Office Action in Korean application 2008-7026775, corresponding to U.S. Appl. No. 11/730,361, citing KR100610929. Dated Aug. 30, 2010.
Translation of Office Action in Japanese application 2004-515701 corresponding to U.S. Appl. 10/563,471, citing WO00050971, JP2000-031877, JP2002-033691, JP2002-111571 and JP11-127104 Dated May 25, 2010.
Translation of Office Action in Japanese application 2004-565505, corresponding to U.S. Appl. 10/563,471, citing JP08-097762, JP2001-111575, JP09-018484 and JP11-055713. Dated Sep. 14, 2009.
Translation of Office Action in Japanese application 2009-503041, corresponding to U.S. Appl. No. 11/730,361, citing W005115022, JP10-135892, JP2005-531265, 2006-503481, JP2005-531202 AND JP2006-505146. Dates Oct. 26, 2010.
Translation of Office Action in Korean application 2009-701639, corresponding to U.S. Appl. No. 12/439,018, citing WO01052447 and US20040208258 Dated Nov. 15, 2010.
Dohler, Mischa, et al., Distributed PHY-layer mesh networks, 14th IEEE Proceedings on Personal, Indoor and Mobile Radio Communications, 2003., The United States of America, IEEE, Sep. 7, 2003, vol. 3, pp. 2543-2547.
Fujii, et al., Ad-hoc Cognitive Radio Cooperated with MAC Layer, Institute of Electronics, Information and Communication Engineers (IEICE) Technical Report, Japan, Institute of Electronics, Information and Communication Engineers (IEICE), May 4, 2005, vol. 105 (36), pp. 59-66.
Translation of Office Action in Japanese application 2007-513349 corresponding to U.S. Appl. No. 11/546,242, citing WO04032362, WO2004001986, JP09214418, JP07131401, JP2004056210, JP2000082983, JP09130322, JP2003244050, JP2003198442, US6377612, JP2006503481, JP2002111571, JP09162801, JP2005531202, WO2004001892 and JP10107727 dated Nov. 16, 2010.
Translation of Office Action in Japanese application 2008-552273 claiming priority from PCT/US2006/002508, citing: DOHLER, Mischa, et al., Distributed PHY-layer mesh networks, 14th IEEE Proceedings on Personal, Indoor and Mobile Radio Communications, 2003., The United States of America, IEEE, Sep. 7, 2003, vol. 3, pp. 2543 to 2547; Fujii, et al., Ad-hoc Cognitive Radio Cooperated with MAC Layer, Institute of Electronics, Information and Communication Engineers (IEICE) Technical Report, Japan, Institute of Electronics, Information and Communication Engineers (IEICE), May 4, 2005, vol. 105 (36), pp. 59 to 66; Zimmermann, et al., "On the performance of cooperative diversity protocols in practical wireless systems," IEEE 58th Vehicular Technology Conference, 2003, The United States of America, IEEE, Oct. 6, 2003, vol. 4, pp. 2212-2216; US6944139; and US5371734, dated Feb. 15, 2011.
Translation of Office Action in Japanese application 2009-526736 corresponding to U.S. Appl. No. 12/307,801, citing US20040110469, US20060019603, JP2005072646, JP2001016152, JP11298421, JP2001136115, JP2005110150, JP2005236626, WO9715991 and WO0199308 dated Jan. 4, 2011.
Zimmermann, et al., "On the performance of cooperative diversity protocols in practical wireless systems," IEEE 58th Vehicular Technology Conference, 2003, The United States of America, IEEE, Oct. 6, 2003, vol. 4, pp. 2212-2216.

* cited by examiner

PHYSICAL LAYER REPEATER WITH SELECTIVE USE OF HIGHER LAYER FUNCTIONS BASED ON NETWORK OPERATING CONDITIONS

CROSS-REFERENCE TO RELATED APPLICATIONS

The present invention is continuation of and claims the benefit of priority of co-pending U.S. patent application Ser. No. 11/339,838, filed Jan. 26, 2006, which is a is continuation-in-part of and claims the benefit of priority of co-pending U.S. patent application Ser. No. 10/531,077, filed on Apr. 12, 2005 and entitled WIRELESS LOCAL AREA NETWORK REPEATER WITH IN-BAND CONTROL CHANNEL, which in turn is a 371 application of International Application PCT/US03/31515, filed on Oct. 24, 2003 and entitled WIRELESS LOCAL AREA NETWORK REPEATER WITH IN-BAND CONTROL CHANNEL, which designated the U.S. and which in turn claimed priority from U.S. Provisional Application Ser. No. 60/420,449, filed on Oct. 24, 2002 and entitled IN-BAND CONTROL CHANNEL METHOD FOR AN RF REPEATER FOR WLAN, the contents of each of the above applications being incorporated herein by reference.

FIELD OF THE INVENTION

The present invention relates generally to wireless local area networks (WLANs) and, more particularly, to selection of higher layer operation for a frequency translating physical layer repeater connecting a client to an Access Point (AP) based on operating conditions.

BACKGROUND OF THE INVENTION

Because of the increasing popularity of unrestrained access to broadband services by, for example, portable computing devices, there is an increasing need to extend the range of nodes such as access points associated with wireless networks, including but not limited to WLANs and wireless metropolitan area networks (WMANs) described and specified in the 802.11, 802.16 and 802.20 standards. The effective proliferation of wireless networks depends heavily on sustaining and increasing performance levels as user demands increase.

Performance shortcomings between actual and specified performance levels can be caused by attenuation of the radiation paths of RF signals, which are typically transmitted at frequencies of 2.4 GHz or 5.8 GHz in an operating environment such as an indoor environment. Base or AP to receiver or client ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system. Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

One common practice in the mobile wireless industry to increase the range of wireless systems is through the use of repeaters. Other approaches can include distributed base stations to broaden coverage areas or the like. However, many of the approaches are prohibitive from an expense standpoint. In more recent discussions within, for example, the Wi-Mesh Alliance IEEE 802.11 Task Group S, the use of ad hoc or mesh networks, where multiple APs are capable of forming connections to each other when proximity is established, are favored as a way of extending the range of the networks. In the proposed evolution of the 802.11(s) standard for mesh networks, mesh nodes are intended to be compatible with the multiple input multiple output (MIMO) and high data rate (540 Mbps) specifications associated with 802.11(n).

Such systems are already deployed in two-way radio networks such as might be used by local government services. In such systems, multiple hops can be traversed before becoming out of range of a primary AP, that is, an AP having the direct connection to the base station, source provider or the like. The primary disadvantage of such systems is the need for expensive proprietary repeaters that are not likely compatible outside of the proprietary network and that are typically configured to operate in accordance with layer 2 or higher of the Open Systems Interconnect (OSI) layered architecture.

It will be appreciated by those of ordinary skill that operation of a repeater at layers above layer 1, commonly referred to as the physical layer (PHY), can cause significant performance issues when time sensitive data or data associated with high bandwidth applications is being transported by the network. For instance, so-called wireless distribution system (WDS) repeaters operate at layer 2 and with a single transceiver causing delay and throughput performance impact as will be discussed in greater detail hereinafter. Because the WDS repeater receives and transmits packets on the same channel, issues such as congestion and at least a 50% reduction in throughput will result. Still further, since the media access control (MAC) address of the packet is modified in conventional layer 2 or higher operation, security features can be compromised along with a reduction in the overall ease of use.

However, for pure physical layer repeaters, problems and complications can arise in that the random packet nature of typical WLAN protocols provides no defined receive and transmit periods. Further, when a series of repeaters are coupled together to serve a client, delays due to cascaded repeating can cause packet acknowledgements (ACKs) to be delayed. Because of delayed ACKs and because packets from each wireless network node are spontaneously generated and transmitted and are not temporally predictable, undesirable consequences such as packet collisions may occur. Some remedies exist to address such difficulties, such as, for example, collision avoidance and random back-off protocols, which are used to avoid two or more nodes transmitting packets at the same time. Under the 802.11 standard protocol, for example, a distributed coordination function (DCF) or other schemes may be used for collision avoidance. However, as the size of a mesh or other network increases, as measured by, for example, the number of "hops," the amount of delay associated with each hop and the likelihood of at least some delay in the return of ACKs or the like makes pure physical layer processing for individual repeaters prone to possible error as timeouts may occur before higher layer protocol messages can be transferred back and forth along the repeated network paths.

Known approaches to providing repeaters in WLANs, and specifically to providing 802.11 compliant repeaters designed to span larger areas, include providing repeaters configured as two Access Points (APs) in the same box with an inter-AP routing capability between them, and providing a store and forward repeater (SF Repeater). Both approaches are reflected in commercially available products. While a repeater configured as two APs in a box may be suitable for expensive outdoor wireless networks, such repeaters do not meet the requirements of low cost and small form factor generally associated with consumer product applications. Further, such repeaters are complicated to install and operate and can lead to compromised security.

Conventional consumer oriented SF repeaters are typically provided with configuration software. The consumer oriented repeater is generally a WDS repeater with a single radio frequency (RF) section as opposed to the two AP approach noted above. Such a repeater is loaded with software which determines the channels used by the AP. Channel information is then communicated by the consumer during initial configuration to the SF repeater to configure the repeater in kind. Problems arise however, in that such systems are difficult to implement for the average consumer as they require some basic knowledge, or at least the ability to interpret data values associated with the WLAN parameters.

One system, described in U.S. National Stage application Ser. No. 10/516,327 based on International Application No. PCT/US03/16208, incorporated by reference herein, and commonly owned by the assignee of the present application, resolves many localized transmission and reception problems by providing a repeater which isolates receive and transmit channels using a frequency detection and translation method. The WLAN repeater described therein allows two WLAN units to communicate by translating packets associated with one device at a first frequency channel to a second device using a second frequency channel. Since the repeater operates as a physical layer device, the MAC address of the packets are not modified, as would be the case in a repeater configured as a layer 2 or higher device. The direction associated with the translation or conversion, such as from the first frequency channel associated with the first device to the second frequency channel associated with the second device, or from the second frequency channel to the first frequency channel, depends upon a real time configuration of the repeater and the WLAN environment. For example, the WLAN repeater may be configured to monitor both frequency channels for transmissions and, when a transmission is detected, translate the signal received on the first frequency channel to the other frequency channel, where it is transmitted to the destination. It is important to note that the frequency translating repeater described in application Ser. No. 10/516,327 acts in near real time to receive, boost and retransmit packets. While addressing many of the problems in the art, the frequency translating repeater described in application Ser. No. 10/516,327 lacks capabilities such as store and forward or higher layer intelligence or processing capability, including filtering traffic based on knowledge of network operating conditions. Such a repeater is the equivalent of, for example, a hub for a wireless LAN.

In general, repeaters will be used where the placement of a wired connection to a LAN, such as an Ethernet LAN connection or the like, is undesirable. Where several repeaters can be used to extend LAN ranges, it would be desirable for a physical layer (PHY) repeater that can address the consequences of delay and the like as described above without being prohibitively expensive. It would be further advantageous for a PHY repeater to be capable of treating packets differently based on characteristics of the packet such as a source or destination address or a priority associated with the packet while preserving packet and network security mechanisms.

SUMMARY OF THE INVENTION

A physical layer frequency translating repeater of the present invention, referred to hereinafter as "physical layer repeater" or "repeater," solves the problems of delay using basic physical layer functionality in conjunction with selective or adaptive higher layer functionality at least part of the time during operation. By providing higher layer functionality, the repeater provides enhanced capabilities and remedies problems by, for example, eliminating delays in processing protocol messages such as ACKs and the like and providing additional intelligence. If more than one AP, repeater or client is present on different channels within the WLAN environment, the repeater may be wirelessly connected to the desired AP in a number of manners, as will be described in greater detail below. The exact degree of higher layer operation can be provided by a configuration determined by a processor through a setting, an analysis of the operating environment, a physical or software slide bar switch or the equivalent.

To alleviate the difficulties noted above, the repeater of the present invention is configured to assume responsibility for the acknowledgments of physical layer packets toward the sender, which is typically a layer 2 function. However, packet retransmission can be begun, but is not required to be begun prior to complete reception of the packet in order to preserve the advantages of physical layer operation such as speed. Packets can further be regenerated to ensure high network performance and layer 2 functionality can be included for each node including the repeater. Regeneration allows any signal degradation in the signal-to-noise ratio (SNR) to be removed prior to retransmission and allows greater receiver sensitivity to be achieved. It should be noted that when the repeater is configured for regeneration, a delay corresponding to the demodulation time associated with at least one symbol of the packet must be incurred—typically around 4 μsecs. Since such a duration would exceed a packet acknowledgement (ACK) timeout interval, the repeater should be configured to be "immune" to timeouts and should be able to supply ACKs to senders to avoid protocol conflicts.

In accordance with certain repeater embodiments, a predetermined amount of delay is set by the physical layer repeater to allow sufficient time to perform demodulation of the address information in the packet and to decide whether to retransmit any particular packet based on demodulated information. Additional time can be established based on whether or not filtering functions or the like will be allowed.

To enable a filtering function, a filtering or routing table is included in the physical layer repeater. The routing table provides information to the repeater regarding how to treat the retransmission of a packet differently based on one of the following: the content of the media access control (MAC) addressing information; the content of the IP or other layer 3 addressing information; the quality of service (QoS) level indicated in the packet information; and/or the type of payload contained in the packet. Based on the content of the various portions of the received packet, the corresponding treatment by the physical layer repeater can include, for example, selection of a different frequency channel based on the above criteria. Further, in accordance with other embodiments of the physical layer repeater, the packet can be terminated or prevented from being repeated, or the packet can be received and demodulated such that the data contained in the payload can be used locally and not wirelessly retransmitted.

Accordingly, the repeater can be configured with the added functionality of a wireless client device.

In performing higher layer or quasi higher layer functions, the physical layer repeater can take responsibility for positive ACK of packets according to the MAC protocol of, for example, 802.11. If address filtering is used, ACK generation would be mandatory as it would in the case noted above where symbol-by-symbol demodulation and re-modulation of the repeated packet associated with regeneration is performed. Demodulation of a packet can be performed in parallel with physical layer repeating to allow for the storage of the address information and payload information in the packet. If no ACK is received from the intended client, the stored packet information can be re-transmitted. In the case where pure physical layer repeating is demanded within the timing requirement associated with the ACK timeout parameter, samples of the unacknowledged packets can be stored and forwarded without demodulation.

As noted above, a filter table or routing table can be used to control routing of packets during, for example, hybrid layer 1/layer 2 operation. In some embodiments, maintenance of the stored routing table or filter table can be conducted based on messaging between the repeater/wireless node and other network elements. Alternatively, maintenance of the routing or filtering tables can be conducted based on observation of packet addresses within the network on each side of the repeater. Observation can be performed in a number of ways to be described in greater detail hereinafter, including continuous observation on both repeating frequency channels of network data traffic in comparison to a corresponding list of various routes between nodes. A list of routes in the network can be constructed observing the MAC addressing with transmissions.

Also as noted above, the physical layer repeater must be configured to take responsibility for ACK generation if address filtering is used. For example, a repeater unit in a lightly loaded or sparse network may use pure physical layer repeating while a unit in a dense network such as a multi tenant dwelling might need to filter packets to reduce the overall congestion in the network due to a "merging" of the collision domains which occur in pure physical layer repeating operations.

The physical layer repeater is capable of performing pure physical layer repeating, capable of performing layer 2 repeating and in some cases layer 3 repeating. The degree of functionality can be established along a sliding scale such that the modes of repeating operation are set based on network conditions or is based instructions received from other wireless nodes. Additional higher layer features can also be added such as the ability to operate as an "associated" client in addition to operating as a hybrid repeating device. For example, a data port could be added to the repeating device such that the repeater unit can act as a network node repeating to other devices, while also being able to receive packets individually addressed to the repeater. Such packets could include data destined to a multimedia device, stereo device, or another type of data device such as a computer or the like. Examples of such a device could include a wireless speaker, a television, a stereo, a video surveillance camera, or a touch screen computer for use in a refrigerator or in the kitchen.

In accordance with other repeater embodiments, the repeater is configured to generate ACKs but also to be independent of the consequences of ACK_Timeout. In addition, the repeater is configured to have a more complete MAC and PHY layer to allow additional functionality. More generally, with a complete PHY and MAC, the repeater can act as a client locally and also perform network interface control (NIC) operation to other devices. With such features, repeater chips can be embedded in other devices, such as those listed above, in addition to being included in stand alone repeaters. The repeater can further operate as what would appear to the rest of the network as a MESH node under, for example, 802.11 (s), but with PHY level repeating capability. Ideally, the repeater can perform demodulation and regeneration of a packet on a symbol by symbol basis. By immunizing the repeater to timeouts, repeaters can be cascaded without concern for delay. Further, the ability of the repeater to perform layer 2 address filtering allows the repeater to break collision domains and dynamically merge them. Thus, the repeater can treat packets with different MAC addresses differently. Layer 2 repeating features can be incorporated dynamically in addition to or in lieu of layer 1 repeating features to optimize network performance.

It should be noted that when the repeater is configured to generate ACKs, the repeater should not generate an ACK if there is a client on the same channel as the AP that will generate an ACK, such as when the client is in range of the AP channel and is on the same frequency. Accommodating such a scenario can be problematic in that as clients move relative to the AP, they may change channels as their proximity to the AP changes. Therefore, to address such client movement, continuous monitoring of traffic may be required to ensure that tables are always up to date. In the case where the client has moved from the repeat channel to the AP channel, the repeater needs to cease generating ACKs. In order to track which channels are allocated, a routing table can be continuously updated by a number of different means. Information included in the updates could be obtained from, for example, continuous observation of the data traffic on the network on both repeating frequency channels and a corresponding list of various routes between nodes. One of ordinary skill will recognize such an observation and listing of routes as similar to a spanning tree algorithm used in layer 2 bridges in wired networks. A list of routes in the network can be constructed observing the MAC addressing with transmissions.

Accordingly, a controller associated with the repeater, such as a processor or a module under the control of a processor, or the like, would prohibit the repeater from ACKing packets for a specific node if the source addressing on any packet on the AP frequency channel contained the MAC address of the node. The controller can therefore act as an effective table pruning mechanism. Conversely, for packets received on the repeat channel with the destination or receiver MAC fields containing MAC addresses associated with the AP channel, those packets can be filtered and not repeated if the repeater is configured for address filtering. In any case, when a packet is repeated from the repeat channel to the AP channel, the source and/or transmitter addressing information must be placed in the table and marked as being on the repeat channel. In a more inclusive approach, all source MAC addresses on the AP channel and all source MACs seen on a repeat channel destination table can be added to a global table. The repeater can then decide whether to pass packets and provide ACKs or whether to withhold ACKs based on the content of these tables. Where multiple repeaters overlapping in frequency are used, a dialog may be established between the repeaters to determine which one, or ones of the repeaters should repeat packets.

Another higher layer mechanism that can be used to update routing tables would be through messaging from other network nodes. Specifically, nodes can identify themselves to each other through a routing update message as could be used for example, in an 802.11(s) MESH standard type network.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE INVENTION

Figure 1:
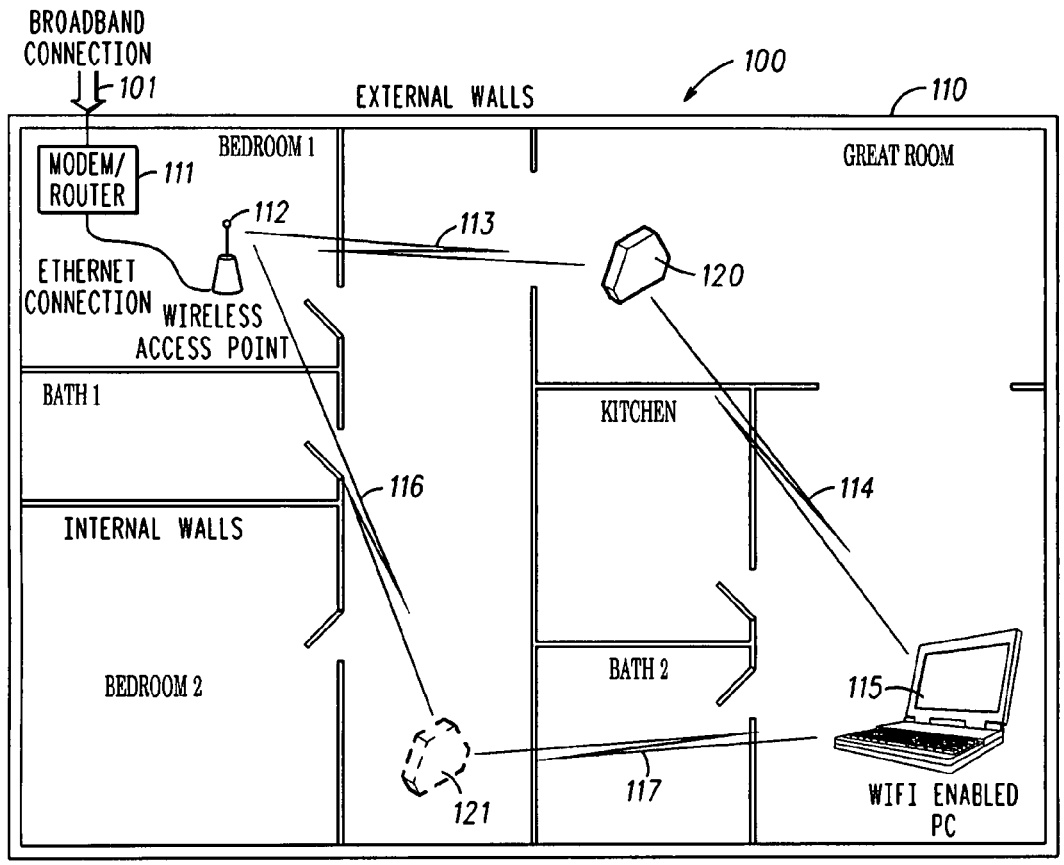
FIG. 1 is a diagram illustrating a basic WLAN including an repeater in accordance with various exemplary embodiments.

Referring now to FIG. 1, a wireless local area network WLAN 100 is shown. WLAN 100 could be, for example, an in-home network configured in a residence 110 with an external broadband connection 101 from a broadband service provider such as a cable company, telephone company or the like. The broadband connection 101 can be coupled to a conversion device such as a MODEM 111, such as a cable modem, router or the like and provides a wired or wireless Ethernet connection to, for example, a wireless access point (AP) 112. In a typical repeating scenario, a first link 113 can be established between the AP 112 and a physical layer repeater 120 located in a suitable area of the residence 110 so that repeating can be conducted, for example, over a second link 114 to a client device 115 such as a PC enabled with an 802.11 interface, such as a WiFi interface or the like.

It will be appreciated that the first link 113 and the second link 114 operate at difference frequencies which can be established in a variety of ways such as at startup, during an initiation procedure, or the like. The repeater 120, in a pure physical layer mode of operation, will receive a packet on the first link 113 and will immediately begin to repeat the packet on the second link 114. If the repeater 120 is configured to regenerate, then the packet can begin to be repeated once at least one symbol of the incoming packet is received, for example after a typical symbol interval of around 4 microseconds. In some embodiments, one or more additional repeaters such as repeater 121 may be present with a first additional link 116 and a second additional link 117 to client 115. It will be appreciated as will be described hereinafter that in such circumstances, the repeaters 120 and 121 must track which repeater is assigned to perform higher layer functions such as generating (ACKs) to the client 115. It is possible using routing tables or filtering tables to track information such as which repeater is responsible for generating acknowledgments and repeating to which clients based on client addresses, AP addresses and the like. Further, multiple repeaters may communicate using inter-repeater communications protocols to establish thresholds such as signal to noise ratios, received signal strength indicators (RSSI) and the like and conditions under which a repeater will assume responsibility for a particular client.

Even when operating with layer 2 or layer 3 functions, the repeater typically can extract addressing information without decoding the payload contents and thus, the physical layer repeater 120 can be used in secure network environments without compromising encryption or the like, particularly when operating in the pure physical mode as will be described hereinafter. Further, the media access control (MAC) addressing information is not modified within the pure physical layer mode of operation providing support for security protocols between the AP 112 and the client device 115 directed to, for example, ensuring packet authenticity.

In an alternative embodiment, a non-frequency translating approach may be used with a physical layer/hybrid repeater in connection with the use of household wiring as described in co-pending U.S. patent application Ser. No. 10/465,817 entitled "WIRELESS LOCAL AREA NETWORK USING EXISTING WIRING AND WIRELESS REPEATER MODULES," and under protocols such as 802.16 as described for example, in co-pending U.S. patent application Ser. No. 11/127,320 entitled "NON-FREQUENCY TRANSLATING REPEATER WITH DETECTION AND MEDIA ACCESS CONTROL," the contents of both applications being incorporated herein by reference.

The present application is also related to U.S. National Stage application Ser. No. 10/529,037 based on International Application PCT/US03/28558 entitled "WIRELESS LOCAL AREA NETWORK WITH REPEATER FOR ENHANCING NETWORK COVERAGE," the contents of which are incorporated herein by reference. The repeating techniques described in application Ser. No. 10/529,037 may be applied in a non-frequency translating approach where they are directed to, for example, MAC addressing. Other techniques described in application Ser. No. 10/529,037 may be less related to a non-frequency translating approach such as receiver to transmitter isolation and the like. However, it should be noted that in both a frequency translating approach and a non-frequency translating approach, the MAC addresses of the source and destination are not modified and thereby provide greater suitability for pure physical layer repeating.

Figure 2A:
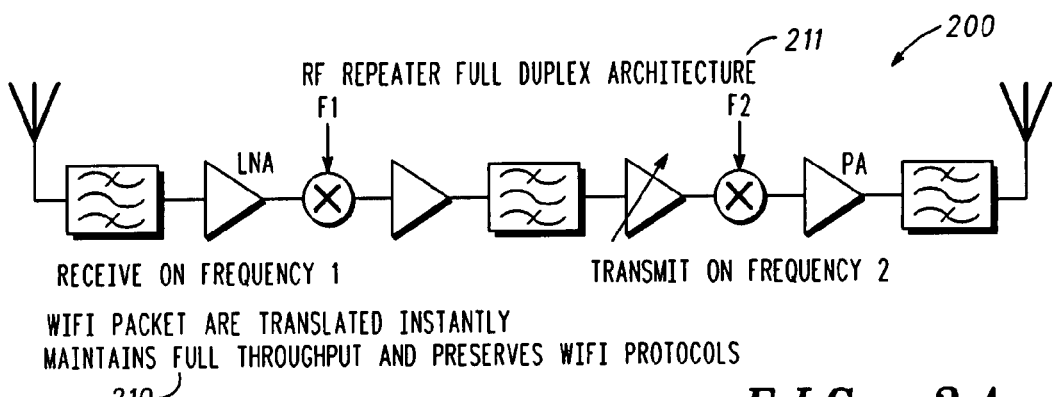
FIG. 2A is a diagram illustrating a repeating path in full duplex physical layer repeater.
Figure 2B:
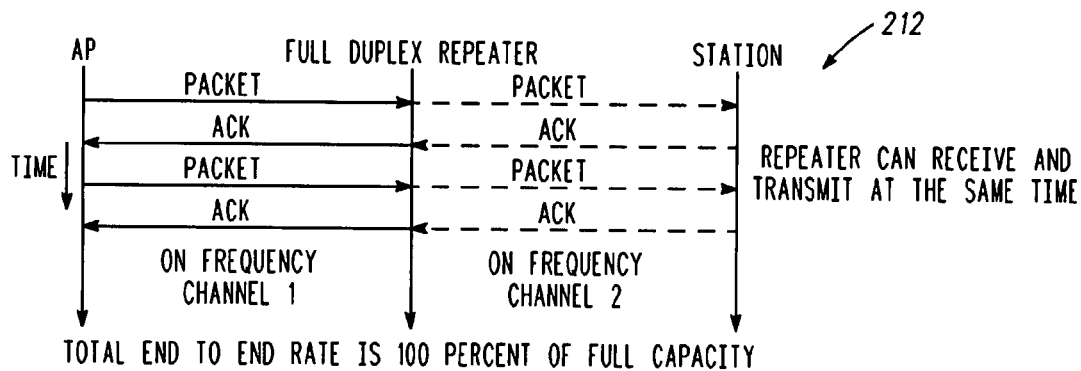
FIG. 2B is a packet flow diagram illustrating comparative latencies associated with the full duplex physical layer repeater depicted in FIG. 2A.

To appreciate the operation of the physical layer repeater 200, two scenarios 210 and 220 are shown in FIGS. 2A, 2B, 2C and 2D. In a pure PHY layer mode of operation, as shown in scenario 210, a configuration 211 is shown in FIG. 2A where a signal is received on a first frequency F1 and repeated on a second frequency F2. The flow diagram 212 of FIG. 2B shows that the packets are essentially received and transmitted at the same time. The packets are transferred with less then 1 microsecond of delay since the repeater is configured in the pure physical layer mode to repeat "instantly." While simultaneous receive and transmit is not an absolute requirement for a PHY layer repeater it provides significant advantages.

Figure 2C:
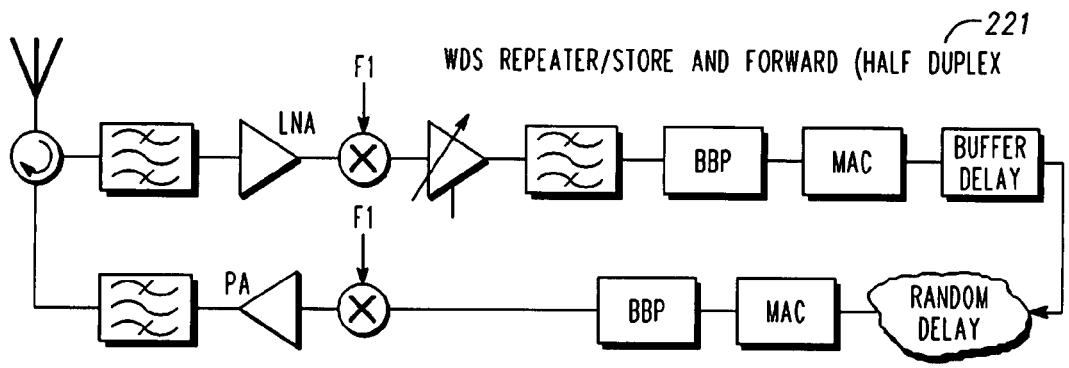
FIG. 2C is a diagram illustrating a repeating path in a half duplex layer 2 store and forward repeater.
Figure 2D:
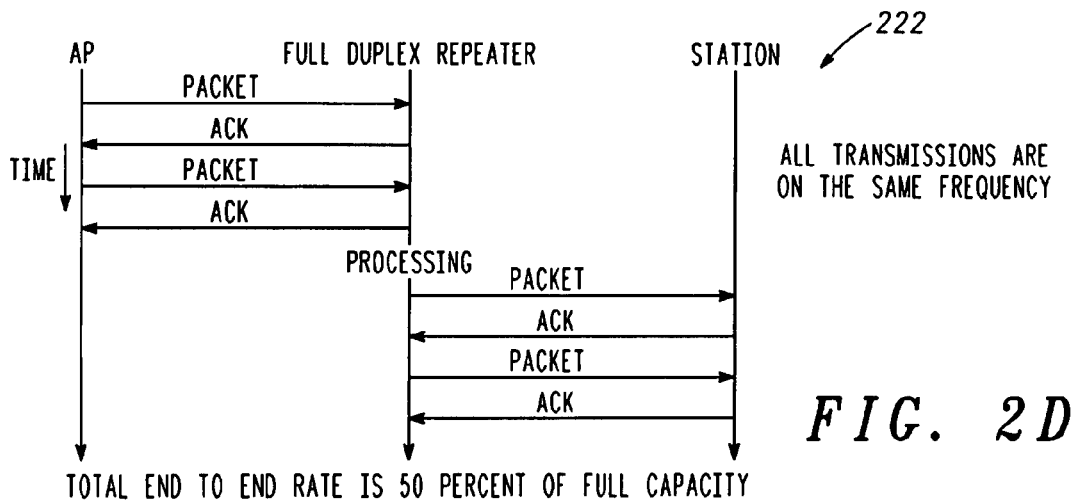
FIG. 2D is a packet flow diagram illustrating comparative latencies associated with the half duplex layer 2 store and forward repeater depicted in FIG. 2C.

In a slightly different example as shown in scenario 220, layer 2 functionality is included and one of a possible number of worst case scenarios is shown. A non-physical layer repeater configuration 221 is shown in FIG. 2C including repeater sections for transmitting and receiving on the same frequency F1. On the receive side, the baseband processing and MAC processing are conducted and, for example, address information is extracted and stored. Thus the repeater stores packets and repeats only when no other traffic is present on the network. Since the repeater receives and transmits on the same frequency, and due to potential random delay caused by the possible presence of other traffic the delay will be at least % 50 and possibly greater. In this scenario, the repeater can demodulate the MAC addressing information so that the packet can be stored and retransmitted when the network is free. The repeater can additionally modify the MAC addressing information in direct contrast to scenario 210 as described above. As can be seen in the flow diagram 222 as shown in FIG. 2C, the repeater receives and acknowledges packets and retransmits them after a processing and buffering delay.

Figure 3:
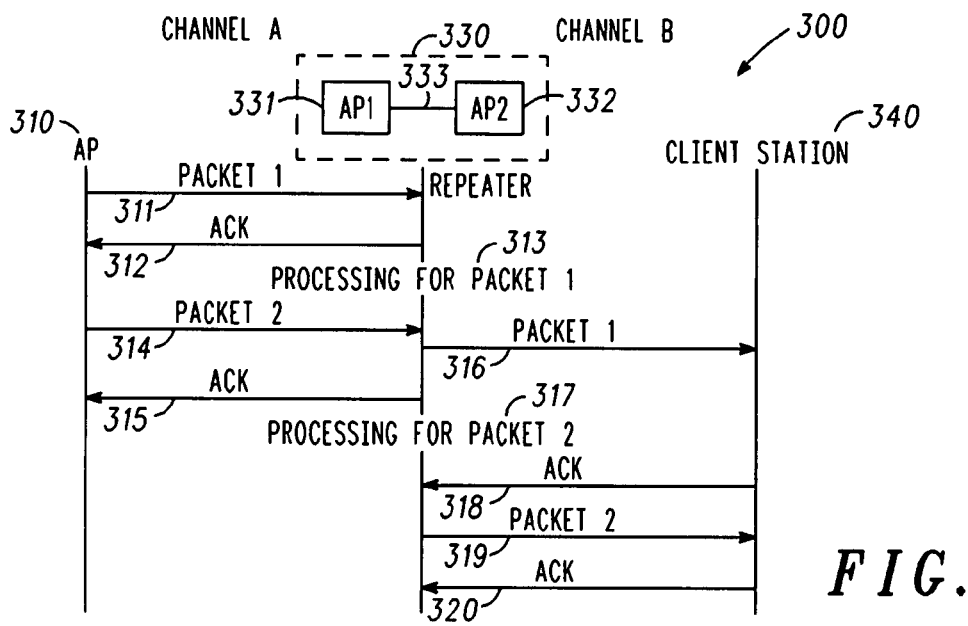
FIG. 3 is a diagram illustrating exemplary packet flow and processing associated with an repeater configuration having two access points (APs).

It will be appreciated that the need for layer 2 type functionality can easily arise in an environment where there is significant network traffic or where only one radio frequency (RF) channel is available and receive/transmit isolation techniques as described above are impractical. Such scenarios can be addressed, as noted above by providing an AP 331 and an AP 332 in the same repeater package 330 as shown in scenario 300 of FIG. 3. The repeater 330, for example receives an entire packet 1 311 from the AP 310 at the AP 331. The AP 331 forwards the packet as packet 1 313 after providing an ACK 312 to the AP 310 to satisfy the protocol for the AP 310. The AP 331 communicates with the AP 332 across a link 333 to establish layer 2 protocols for transmitting the packet, possibly filtering the packet, or conducting other operations.

The repeater 330 then processes the packet 1 311 at 313 and transmits it via the AP 332 as a packet 316 toward a client station 340. At the same time the repeater 330 receives a packet 2 314 at the AP 331. After receiving the entire packet 2 314 and providing an ACK 315 to satisfy the protocol for the AP 310, the repeater 330 can process the packet 2 314 at 317 and any ACK 318 generated from the client station 340. The repeater then transmits packet 2 319 toward the client station 340 and receives the ACK 320. It will be appreciated that the above noted flow can operate in reverse for packets originating from the client 340.

The placement of two APs 331 and 332 in a single box basically provides an alternative new system instead of providing an improved repeater. The repeater 330 disadvantageously requires substantial hardware and firmware for providing multiple stripped-down access points. Further, with commercially available APs, the channel linearity and selectivity prevents a transmitter on one channel from being physically near a receiver on another channel without significant performance impacts. Finally, of great importance, substantial security and configuration complications arise in that, in a dual AP configuration, a change in the MAC address information in the packet is required, thereby invalidating some security protocols such as WiFi protected access (WPA) or 802.11(i) (WPA2), or the like.

Figure 4:
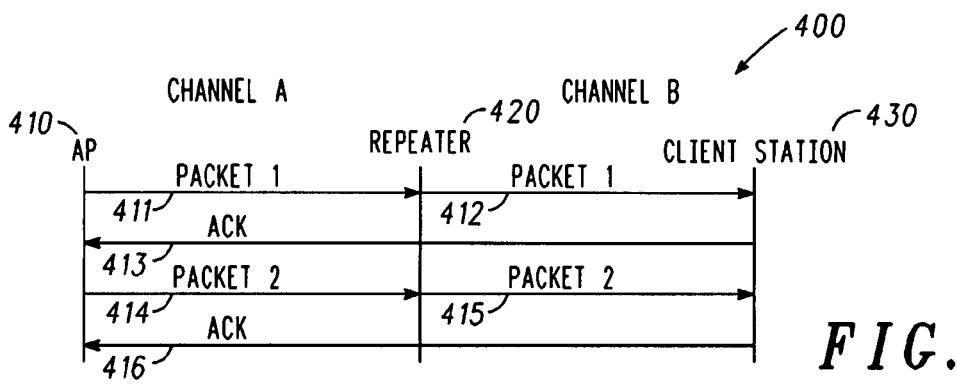
FIG. 4 is a diagram illustrating exemplary packet flow and processing associated with an repeater configuration embodied as a pure physical layer repeater.

In contrast, as shown in FIG. 4, a pure physical layer repeater scenario 400 can be used to transmit packets instantaneously while, with little more than the existing physical repeater components, provide higher layer functions as will be described hereinbelow. An AP 410 can send a packet 1 411 destined for a client 430. The repeater 420 configured as a pure physical layer repeater will begin transmitting packet 1 412 toward the client 430 as soon as it receives a signal associated with packet 1 411. In such a scenario, no ACK is generated by the repeater 420. Rather, after the entire packet 1 412 is received by the client 430, an ACK 413 is generated by the client 430, which can be instantly repeated toward the AP 410 by the repeater 420. A packet 2 414 can be sent in a similar manner and transmitted instantly by the repeater 420 toward the client 430 as packet 2 415. When the client 430 receives the entire packet 2 415, it generates an ACK 416 toward the AP 410, which can be instantly repeated toward the AP 410 by the repeater 420. It will be appreciated that the above noted flow can operate in reverse for packets originating from the client 430. Note that the above noted flow can apply to the alternative embodiment associated with a physical layer repeater in a non-frequency translating configuration.

It should be noted that the above scenarios are directed to pure physical layer repeating, such as where the signals are re-transmitted without demodulation and decoding and without MAC address modification. One primary benefit of such repeating aside from speed is the ability to maintain network security while performing repeating operations. If a packet is repeated from a baseband receiver on the sender side to a baseband transmitter on the destination side, as a pure physical layer repeater, no layer 2 information is decoded or modified. Thus speed and security are maintained. As layer 2 functionality is increased, some delay is incurred for increased intelligence and regenerative capability, which enhances overall network performance. It is still possible in the physical layer+layer 2 scenarios outlined below to preserve network security since, while MAC addressing information can be decoded to baseband for regeneration, the MAC addressing information it is not modified. Further, while the payload content may be demodulated, is not decoded, disturbed or otherwise re-encapsulated, which preserves the integrity of encryption. Still further, in the case of 802.11 (i) security, the entire packet may be demodulated and regenerated but with no modifications, maintaining the integrity of the protocol. Specifically, none of the MAC addressing information is modified. Thus, the physical layer repeater with higher layer functions is suitable for use in secure networks.

Figure 5:
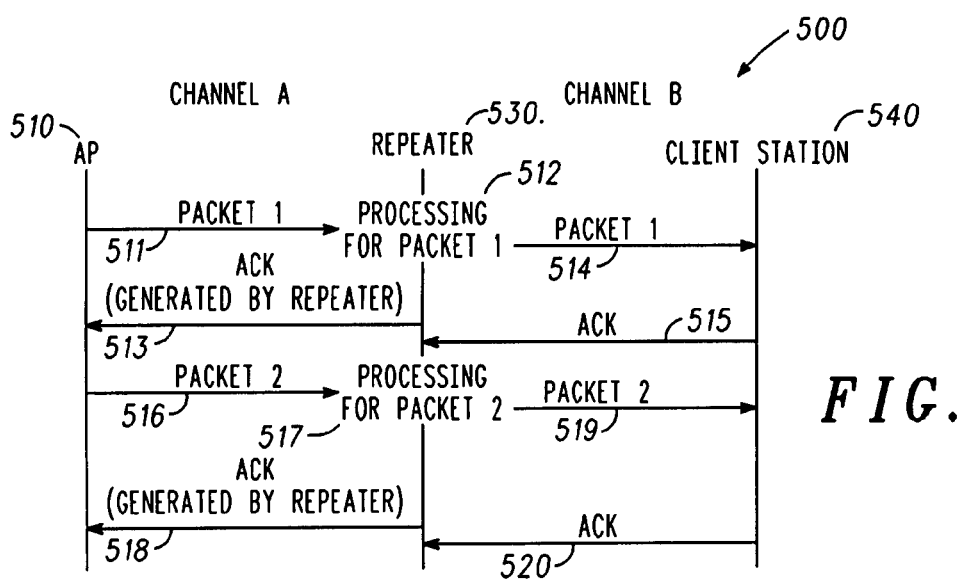
FIG. 5 is a diagram illustrating exemplary packet flow and processing associated with a repeater configuration embodied as a physical layer repeater including higher layer processing capabilities.

As shown in FIG. 5, a physical layer repeater can be selectively provided with layer 2 and some layer 3 functionality and, as described herein, can implement these higher layer functions without disrupting security or encryption. In FIG. 5, an AP 510 sends a packet 1 511 toward a client 540. A physical layer repeater 530 which has been equipped with layer 2 and optionally a subset of layer 3 functions is configured to begin processing at 512 upon reception. Processing may include baseband demodulation to extract preamble and MAC addressing information for the purposes of regeneration and possibly more. In a regenerative scenario, the repeater 530 can wait at least one symbol duration before beginning regeneration of, for example, a packet 1 514, which is generated toward the client 540. Once the entire packet 1 511 is received, the repeater 530 generates an ACK 513 toward the AP 510 to satisfy the protocol requirements of the AP 510. It will be appreciated that if the ACK 513 was not generated and significant delay was encountered, a packet timeout could occur and the protocol controller in AP 510 would assume that the packet was not received or was received in error.

When the client 540 receives the entire packet 1 514, an ACK 515 is generated toward the repeater 530. If it is determined that the client 540 is on the repeater channel, blindly generating an ACK will cause issues if the client 540 is also on the same channel as the AP 510, as two devices will be generating ACKs. The result is a probable collision, with no ACKs being received by the AP 510. Here, a is be used to determine if the ACK should be generated or not based on the MAC address and repeating direction. The table may be populated by observing the MAC addressing of packets on the network. In particular, if the repeater 530 repeats a packet that generates an ACK to the sender, but never receives an ACK from the intended recipient, even after several retries, it may be determined that the client is no longer present on the repeated channel. In such a case, the repeater 530 sends a protocol message, such as a NULL packet, to the client to determine if the client is still present. If the client is not present, it will be deleted from the table and no more ACKs will be generated by the repeater on behalf of that client. The table may be periodically updated and verified in such a manner.

A second packet 2 516 is sent by the AP 510, and the repeater 530 immediately begins processing at 517 as described above in connection with the processing 512. The repeater can regenerate and send packet 2 519 immediately upon receiving at least a first symbol. When the repeater 530 receives the entire packet 2 516 an ACK 518 is generated toward the AP 510. When the client 540 receives the entire packet 2 519, an ACK 520 is generated toward the repeater 530.

It will be appreciated that a primary benefit of layer 2 operation is the ability to extract and potentially manipulate the handling associated with the packet or to filter transmission of the packet for selected MAC addresses. Such a capability is useful in a contentious environment where multiple client and possibly multiple AP nodes are present. In addition, in some embodiments, a client node can be equipped with a repeater and, with layer 2 functionality, can act as a network interface controller (NIC).

Figure 6:
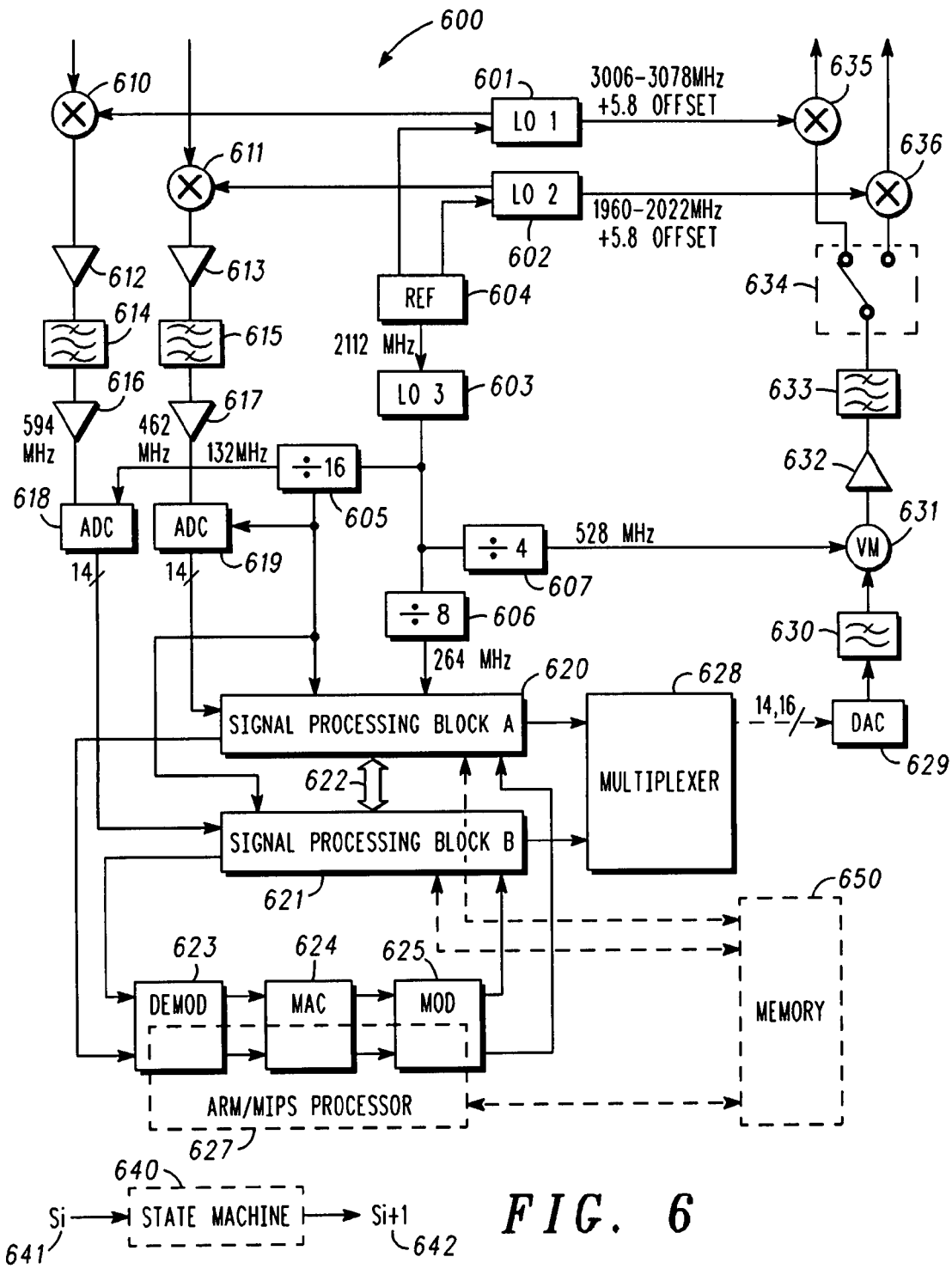
FIG. 6 is a circuit diagram illustrating various hardware components associated with an repeater configuration embodied as a physical layer repeater including higher layer processing capabilities.

With reference to FIG. 6, a physical layer repeater circuit 600 is shown for receiving on two frequency channels. A local oscillator LO 1 601 is used to drive one set of receive and transmit channels for down-conversion and up-conversion through an input mixer 610 on the receive side and an output mixer 635 on the transmit side. For down-conversion, the input mixer 610 mixes a signal received from, for example, an antenna and inputs the mixed signal to amplifier 612 as will be appreciated. The output of amplifier 612 passes through a bandpass filter element 614 the output of which is transferred to amplifier 616 at intermediate frequency of, for example, 594 MHz. The output of the IF stage amplifier 616 is transferred to analog-to-digital converter (ADC) 618 which is preferably a 14 bit converter. The other set of receive and transmit channels are coupled to LO 2 602, which is used for down down-conversion and up-conversion through an input mixer 611 on the receive side and an output mixer 636 on the transmit side. For down-conversion, the input mixer 611 mixes a signal received from, for example, an antenna and inputs the mixed signal to amplifier 613. The output of amplifier 613 passes through a bandpass filter element 615, the output of which is transferred to amplifier 617 at intermediate frequency of, for example, 462 MHz. The output of the IF stage amplifier 617 is transferred to ADC converter 619 which is also preferably a 14 bit converter. Preferably, no automatic gain control (AGC) is performed prior to conversion. It should be noted that the ADC converters 618 and 619 are driven, for example, at 132 MHz sampling by a clock generated from divider 605, which is coupled to an LO 3 603. The LO 1 601, the LO 2 602 and the LO 3 603 are all coupled to a reference source 604 which generates, for example, a 2112 MHz clock reference. In such a way, all the processing elements will be synchronized to a common clock reference for more accurate processing.

In order to perform additional baseband digital processing of the received signals, the outputs of the ADC 618 and the ADC 619 are coupled to dedicated signal processing blocks such as a signal processing block A (SPBA) 620 and a signal processing block B (SPBB) 621. The SPBA 620 and the SPBB 621 are coupled with a signal processing bus 622. The SPBA 620 and the SPBB 621 may further have digital outputs which couple the baseband signal to a demodulator DEMOD 623, which in turn is coupled to a media access control (MAC) block 624 and finally to a modulator MOD 625, which is coupled back to the SPBA 620 and the SPBB 621 for output or further processing if necessary. The output of the DEMOD 623 can be used to actually decode information such as the MAC address and the like whereupon MAC block 624 can perform MAC processing for packets under the control of for example processor 627, which can be a high performance processor such as an advanced reduced instruction set computer (RISC) machine (ARM) or a million instructions per second (MIPS) type processor or the like. The processor 627, acting as a controller, would prohibit the repeater from ACKing packets for a specific node if the source addressing on any packet on the AP frequency channel contained the MAC address of the node effectively acting as a table pruning mechanism. Packets received on the repeat channel with the destination or receiver MAC fields containing MAC addresses associated with the AP channel, are filtered and not repeated if the repeater is configured for address filtering. When a packet is repeated from the repeat channel to the AP channel, the source and/or transmitter addressing information must be placed in the table, for example, in memory 650, and marked as being on the repeat channel. Alternatively, all source MAC addresses on the AP channel and all source MACs seen on a repeat channel destination table can be added to a global table. The repeater can then decide whether to pass packets and provide ACKs or whether to withhold ACKs based on the content of these tables. Where multiple repeaters overlapping in frequency are used, a dialog may be established between the repeaters to determine which one, or ones of the repeaters should repeat packets using for example Xtender Operating System (XOS), or an equivalent messaging protocol.

Alternatively, the MAC block 624 combined with the processor 627 or state machine 640 may act as a symbol by symbol delay line rather than block 620 and 621. Accordingly, each symbol is demodulated and the information is passed to modulator with no manipulation of the retransmitted symbols only regeneration thereof. Processing in such a manner can be established based on network conditions and allows for increased sensitivity to the received signal on the part of the receiver leading to a higher quality of the repeated signal and improved performance and range. Optionally a state machine 640 can be used to help control the operation of the repeater by generating an output state or state vector Si+1 642 based on a previous state or state vector Si 641 as will be appreciated by one of ordinary skill in the art.

In parallel with the sample level repeating or symbol-by-symbol regenerative repeating, the MAC block 624, state machine 640, and processor 627 may observe the addressing of the packets and perform layer 2 processing as configured including generating ACKs. By demodulating the baseband information, the physical layer repeater now has access to addressing information and through the operation of the processor 627 and attendant high speed memory 650, can filter packets, redirect packets, direct packet to destinations based on quality of service (QoS) parameters or the like. When the packet is ready to be retransmitted, using sample-by-sample, or symbol-by-symbol repeating, the SPBA 620 and the SPBB 621 output the data samples to the multiplexer 628 which selects the appropriate one of the SPBA 620 and the SPBB 621 for output based on which channel the signal was detected and subsequently processed on. If symbol-by-symbol repeating is used, the modulator 625 will pass the data samples on to SPBA 620 or SPB 621 to use as the source of the retransmitted packet. The output of the multiplexer 628, which is typically a 14 to 16 bit digital value is coupled to a digital-to-analog converter (DAC) 629 which outputs an analog signal. The analog output of the DAC 629 is coupled to a low pass filter (LPF) element 630 to remove any quantizing noise and the output of the LPF element 630 is coupled as a modulating input to a vector modulator (VM) 631 a digital IF frequency signal at for example, 528 MHz to begin up-conversion. The output of the VM 631 is input to an amplifier 632 the output of which is coupled to a bandpass filter (BPF) element 633. The output of BPF element 633 is coupled to an RF switch 634 and depending on which channel the information is to be repeated on, the RF switch 634 will direct the signal to an output mixer 635 or an output mixer 636, where the modulated IF signal will be mixed with a 3006-3078 MHz signal from LO 1 601 or an 1960-2022 MHz signal each with a 5.8 MHz offset.

As will be appreciated by one of ordinary skill in the art, an physical layer repeater is capable of receiving two different frequencies simultaneously, determining which channel is carrying a signal associated with, for example, the transmission of a packet, translating from the original frequency channel to an alternative frequency channel and retransmitting the frequency translated version of the received signal on the alternative channel. Details of basic internal repeater operation in accordance with various embodiments may be found, for example, in co-pending PCT Application No. PCT/US03/16208.

The physical layer repeater can receive and transmit packets at the same time on different frequency channels thereby extending the coverage and performance of the connection between an AP and a client, and between peer-to-peer connections such as from one client unit to another client unit and allowing the merging of network collision domains or network segments. Such merging is advantageous when delay sensitive applications are using the channel as little or no queuing of packets on the repeater will occur resulting in higher performance. When many units are isolated from one another, the repeater further acts as a wireless bridge allowing two different groups of units to communicate where optimum RF propagation and coverage or, in many cases, any RF propagation and coverage was not previously possible.

Figure 7:
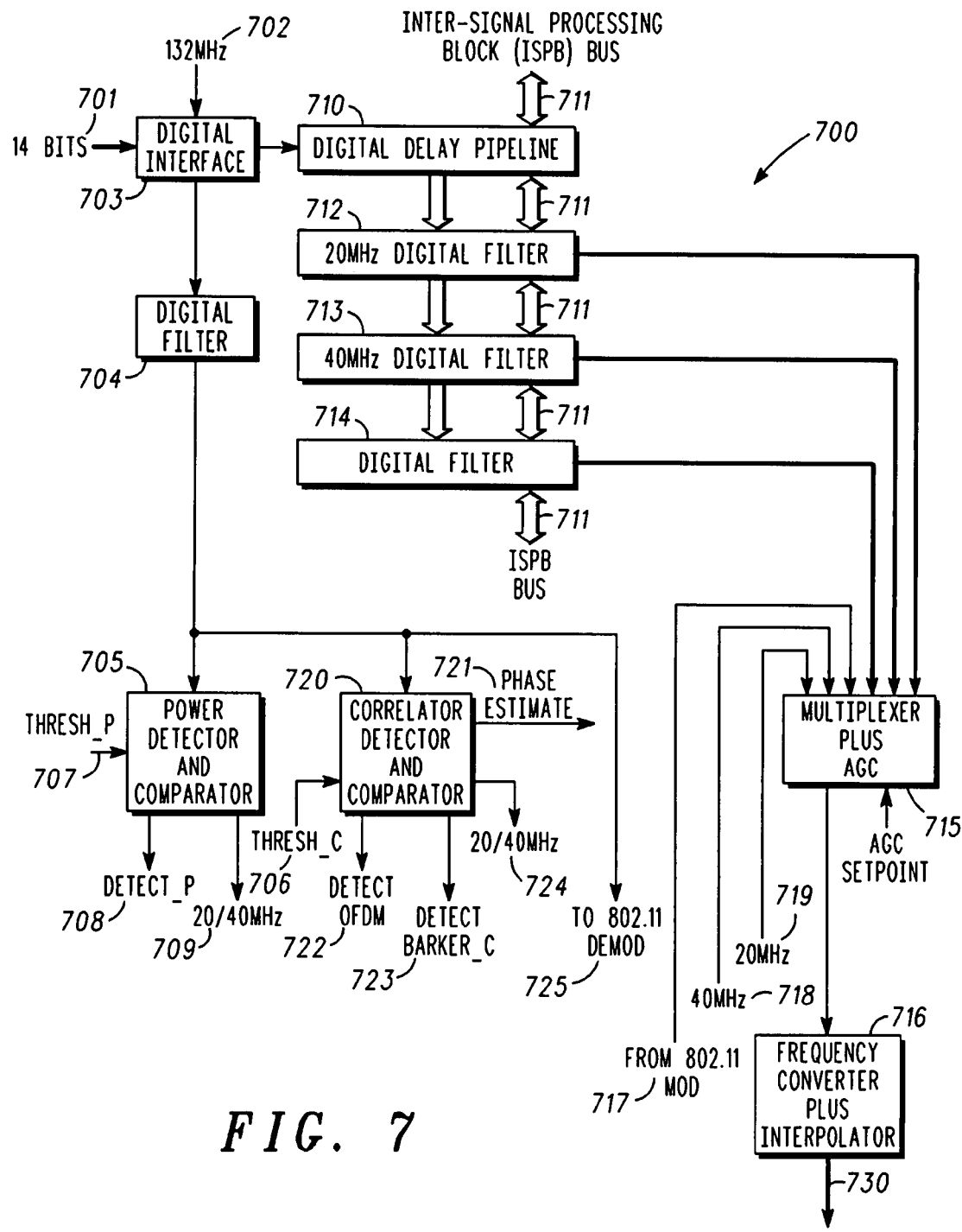
FIG. 7 is a circuit diagram further illustrating various hardware components associated with signal processing in an repeater configuration embodied as a physical layer repeater including higher layer processing capabilities.

In order to facilitate the operation of the physical layer repeater, and, in some cases, to replace certain expensive components such as surface acoustic wave (SAW) filters, a series of digital signal processing blocks can be used to perform a series of functions. As shown in FIG. 7, a physical layer repeater scenario 700 is shown where various digital filter components are connected to provide filtering functions. Digital data 701 received from, for example, an ADC, can be input at a digital interface 703 according to data clock 702 at a clocking rate of 132 MHz. Portions of the digital signal can be input to an auxiliary digital filter 704 the output of which can be used, inter alia, for power detection at power detector and comparator 705. The signal levels can be established with threshold levels THRESH_C 706 corresponding to a correlation threshold and THRESH_P 707 corresponding to a power threshold. The output of the power detector and comparator 705 is a threshold detection signal DETECT_P 708 and a channel width detector signal 20/40 MHz 709, which provides an initial indication of the packet bandwidth based on a coarse power determination. A correlator detector and comparator 720, which also receives the filtered output signal from the auxiliary digital filter 704, can be used to determine the presence of orthogonal frequency division multiplexing (OFDM) and the presence of a barker code or signal indicating the use of direct sequence (DS) spread spectrum modulation. Accordingly, the THRESH_C 706 input corresponding to a correlation threshold can be input to the correlator detector and comparator 720, which outputs an OFDM DETECT signal 722 indicating a high level of correlation with OFDM, a BARKER_C DETECT signal 723 indicating a high level of correlation with a barker code in the present transmission, and a phase estimate 721. A more accurate channel width detector signal 20/40 MHz 724 can be output and the output of digital filter 704 can be forwarded at 725 to an 802.11 demodulator.

The digital signal 701 can also be forwarded to a digital delay pipeline 710, where it can be delayed until certain processing has been conducted as will be appreciated. A 20 MHz digital filter 712 can be used to process a signal transmitted on a 20 MHz channel or a 40 MHz digital filter 713 can be used to process a signal transmitted on a 40 MHz channel. An additional digital filter 714 can be used to conduct additional filtering. The digital filters can be coupled to each other and to additional signal processing blocks such as the signal processing blocks A 620 and B 621 as shown in FIG. 6, through an inter signal processing block (ISPB) bus 711 which is also shown in FIG. 6 as the bus 622. For repeating, the output of the appropriate one or more of the digital filters can be input to multiplexer and automatic gain control (AGC) unit 715 where control inputs for 40 MHz 718 and 20 MHz 719 can be used to select which of the filter outputs will be transmitted. The output of a modulator can also be coupled to the multiplexer and AGC unit 715 for transmitting information demodulated from the signal if appropriate. The AGC portion of the multiplexer and AGC unit 715 can be used to establish the zero thresholds and gain thresholds for reverse quantizing prior to digital to analog conversion. The output of the multiplexer and AGC unit 715 is input to a frequency converter and interpolator 716 for up conversion and output at 730 to the RF transmitter section (not shown).

Although several embodiments are shown herein for the physical layer repeater with selective layer 2 and higher functions, the number of embodiments is for illustrative purposes and may not be exhaustive. It will be appreciated that changes and alterations to specific components, and the interconnections thereof, can be made by one of ordinary skill in the art without deviating from the intended scope of the present invention as defined by the following claims.

What is claimed is:
1. A physical layer repeater comprising:
   a digital baseband section including a demodulator, the digital baseband section for processing a packet for repeating during a physical layer repeating operation, the processing including demodulating a portion of the packet; and
   a processor coupled to the digital baseband section, the processor configured to:
      conduct one of a plurality of higher layer functions during the physical layer repeating operation including:

processing first information from the demodulated portion of the packet without modification of a source address and a destination address associated with the packet; and determining whether to retransmit the packet and whether to transmit protocol information during the physical layer repeating operation according to one of a layer 2 protocol, and one of a plurality of higher than layer 2 protocols, based on the first information and a configuration of the repeater.

2. The physical layer repeater according to claim 1, wherein the repeating operation includes a frequency translating physical layer repeating operation.

3. The physical layer repeater according to claim 1, wherein the one of the plurality of the higher layer functions includes generating an acknowledgment (ACK) of the packet.

4. The physical layer repeater according to claim 3, wherein the generating the ACK includes generating the ACK according to a media access control (MAC) protocol.

5. The physical layer repeater according to claim 1, wherein the layer 2 protocol includes a media access control (MAC) protocol according to one of an 802.11 specification and a 802.16 specification.

6. The physical layer repeater according to claim 1, wherein the processor, in determining whether to process the packet during the physical layer repeating operation according to the one, is further configured to regenerate a portion of the packet for the physical layer repeating operation while performing the determining.

7. The physical layer repeater according to claim 1, wherein the configuration includes a setting value from one of a physical slide bar setting and a virtual slide bar setting.

8. The physical layer repeater according to claim 1, wherein:
the demodulator is configured to demodulate a source address and a destination address associated with the packet;
the digital baseband section further includes a digital delay line; and
the digital delay line is set with a predetermined delay value to compensate for the demodulation of the source address and the destination address.

9. The physical layer repeater according to claim 1, wherein the demodulator is configured to demodulate media access control (MAC) information including one or more of:
a media access control (MAC) address, an internet protocol (IP) address, a layer 3 address, a quality of service (QoS) level parameter, a payload type associated with a payload contained in the packet.

10. A physical layer repeater for repeating a signal associated with a packet, the signal received on one of two receivers, comprising:
a digital baseband section including a demodulator and a signal processing section, the signal processing section including a first signal processor associated with a first of the two frequency channels and a second signal processor associated with a second of the two frequency channels; and
a processor coupled to the digital baseband section, the processor controlling the operation of the digital baseband section, the processor configured to:
control the demodulator to demodulate a received signal associated with a packet on a symbol-by-symbol basis to form a demodulated symbol in a first symbol interval; and
regenerate the demodulated symbol associated with the packet in a one of the first signal processor and the second signal processor associated with the one of the two receivers on which the signal is received after at least a second symbol interval and prior to completion of the demodulating the received signal associated with the packet to form a regenerated symbol.

11. The physical layer repeater according to claim 10, wherein the processor is further configured to retransmit the regenerated symbol prior to completion of the demodulating the received signal associated with the packet.

12. The physical layer repeater according to claim 10, wherein the processor is further configured to:
determine network information associated with the packet after a predetermined number of symbols are demodulated; and
perform a packet operation based on the network information.

13. The physical layer repeater according to claim 12, wherein the network information includes media access control (MAC) information, and a quality of service (QoS) parameter, and wherein the packet operation includes an acknowledgement (ACK), a withholding of the ACK, a packet redirection, and a packet direction based on the QoS parameter.

14. The physical layer repeater according to claim 10, further comprising a memory coupled to the processor and the digital baseband section, wherein the digital baseband section includes a media access control (MAC) block, and wherein processor is further configured to:
store a plurality of the processed symbols associated with the packet in the memory; and
regenerate and retransmit the plurality of processed symbol after a predetermined delay interval,
wherein the predetermined delay period is generated in the MAC block and includes an acknowledgement timeout period.

15. A hybrid network device for operating in a wireless network, the hybrid network device comprising:
a network node portion including a network interface for coupling to the wireless network and receiving packets directed to the hybrid network device, first ones of the packets for providing first information for the hybrid network device and second ones of the packets for providing second information for controlling a physical layer repeating operation; and
a physical layer repeater portion coupled to the network node portion, the physical layer repeating portion for conducting the physical layer repeating operation in the wireless network, the physical layer repeating operation including receiving a signal associated with a repeated packet and transmitting the signal associated with the repeated packet, the physical layer repeater comprising:
a digital baseband section including a demodulator; and
a processor coupled to the digital baseband section, the processor configured to process the signal to obtain one or more of a source address and a destination address contained in the repeated packet.

16. The hybrid network device according to claim 15, wherein the processor is further configured to regenerate and retransmit the repeated packet based on the second information.

17. The hybrid network device according to claim 15, wherein the processor is further configured to retransmit the packet simultaneously with the processing the signal without regenerating the packet.

18. The hybrid network device according to claim 15, wherein the first information includes multimedia content.

19. The hybrid network device according to claim 15, wherein the second information includes an address of another device in the wireless network.

20. The hybrid network device according to claim 15, wherein the hybrid network device includes an audio component, a video component, and an appliance.

21. A physical layer repeater comprising:
a digital baseband section including means for processing a packet for repeating during a physical layer repeating operation, the means for processing the packet including means for demodulating at least a portion of the packet to generate a demodulated portion of the packet; and
processing means coupled to the digital baseband section, the processing means for:
conducting one of a plurality of higher layer functions during the physical layer repeating operation including:
processing first information from the demodulated portion of the packet without modification of a source address and a destination address associated with the packet; and
determining whether to retransmit the packet and whether to transmit protocol information during the physical layer repeating operation according to one of a layer 2 protocol, and one of a plurality of higher than layer 2 protocols, based on the first information and a configuration of the repeater.

22. The physical layer repeater according to claim 21, wherein the conducting one of the plurality of the higher layer functions includes generating an acknowledgment (ACK) of the packet.

23. The physical layer repeater according to claim 22, wherein the generating the ACK includes generating the ACK according to a media access control (MAC) protocol.

24. The physical layer repeater according to claim 21, wherein the processing means is further for regenerating a portion of the packet for the physical layer repeating operation while performing the determining.

25. The physical layer repeater according to claim 21, wherein:
the means for demodulating at least a portion of the packet comprises means for demodulating a source address and a destination address associated with the packet;
the digital baseband section further includes a digital delay line; and
the digital delay line is set with a predetermined delay value to compensate for the demodulation of the source address and the destination address.

26. The physical layer repeater according to claim 21, wherein the means for demodulating at least a portion of the packet comprises means for demodulating media access control (MAC) information including one or more of: a media access control (MAC) address, an internet protocol (IP) address, a layer 3 address, a quality of service (QoS) level parameter, a payload type associated with a payload contained in the packet.

27. A physical layer repeating means for repeating a signal associated with a packet, the signal received on one of two receivers, comprising:
a digital baseband section including a demodulator and a signal processing section, the signal processing section including a first signal processor associated with a first of the two frequency channels and a second signal processor associated with a second of the two frequency channels; and
processing means coupled to the digital baseband section, the processing means for controlling the operation of the digital baseband section, the processor means for:
controlling the demodulator to demodulate a received signal associated with a packet on a symbol-by-symbol basis to form a demodulated symbol in a first symbol interval; and
regenerating the demodulated symbol associated with the packet in a one of the first signal processor and the second signal processor associated with the one of the two receivers on which the signal is received after at least a second symbol interval and prior to completion of the demodulating the received signal associated with the packet to form a regenerated symbol.

28. The physical layer repeater according to claim 27, wherein the processing means is further for retransmitting the regenerated symbol prior to completion of the demodulating the received signal associated with the packet.

29. The physical layer repeating means according to claim 27, wherein the processing means is further for:
determining network information associated with the packet after a predetermined number of symbols are demodulated; and
performing a packet operation based on the network information.

30. The physical layer repeating means according to claim 27, further comprising a memory coupled to the processing means and the digital baseband section, wherein the digital baseband section includes a media access control (MAC) block, and wherein processing means is further for:
storing a plurality of the processed symbols associated with the packet in the memory; and
regenerating and retransmitting the plurality of processed symbol after a predetermined delay interval,
wherein the predetermined delay period is generated in the MAC block and includes an acknowledgement timeout period.

* * * * *